US012706627B2

(12) United States Patent
Lu

(10) Patent No.: US 12,706,627 B2
(45) Date of Patent: Aug. 11, 2026

(54) ASSEMBLY STRUCTURE FOR MOBILE PHONE CLIP MODULE

(71) Applicant: Ningbo Weifeng Intelligent Technology Co., Ltd., Ningbo (CN)

(72) Inventor: Qi Lu, Ningbo (CN)

(73) Assignee: Ningbo Weifeng Intelligent Technology Co., Ltd., Ningbo (CN)

( * ) Notice: Subject to any disclaimer, the term of this patent is extended or adjusted under 35 U.S.C. 154(b) by 339 days.

(21) Appl. No.: 18/602,191

(22) Filed: Mar. 12, 2024

(65) Prior Publication Data

US 2025/0274156 A1 Aug. 28, 2025

(30) Foreign Application Priority Data

Feb. 24, 2024 (CN) ......................... 202420342196.1

(51) Int. Cl.

| | |
|---|---|
| ***H04B 1/38*** | (2015.01) |
| ***F16B 1/00*** | (2006.01) |
| ***F16M 11/14*** | (2006.01) |
| ***H04B 1/3877*** | (2015.01) |
| ***H04B 7/00*** | (2006.01) |
| ***H04M 1/04*** | (2006.01) |

(52) U.S. Cl.

CPC ............ *H04B 1/3877* (2013.01); *H04M 1/04* (2013.01)

(58) Field of Classification Search

None

See application file for complete search history.

(56) References Cited

U.S. PATENT DOCUMENTS

| | | | | |
|---|---|---|---|---|
| 8,128,046 | B1 * | 3/2012 | Howard, Jr. | A45F 5/02 248/316.5 |
| 9,898,042 | B2 * | 2/2018 | Abbott | H04M 1/04 |
| 10,161,429 | B2 * | 12/2018 | Goffman | F16M 11/10 |
| 10,512,322 | B2 * | 12/2019 | Washington | F16M 11/14 |
| D988,395 | S * | 6/2023 | Foster | D8/395 |
| 12,381,970 | B2 * | 8/2025 | Liu | H04M 1/04 |
| 2008/0110946 | A1 * | 5/2008 | Dixon | B60R 11/0241 224/197 |
| 2018/0010622 | A1 * | 1/2018 | Wu | H04M 1/04 |
| 2018/0086281 | A1 * | 3/2018 | Chiou | F16M 11/041 |

* cited by examiner

*Primary Examiner* — Pablo N Tran

(74) *Attorney, Agent, or Firm* — Wang Law Firm, Inc.

(57) ABSTRACT

The present disclosure provides an assembly structure for a mobile phone clip module. The assembly structure for a mobile phone clip module includes a mobile phone clip body. The back of the mobile phone clip body is provided with a chuck for assembly. The assembly structure for a mobile phone clip module also includes an assembly seat. An assembly cavity for the chuck to enter is formed in the assembly seat. The assembly cavity is internally provided with a first locating piece, and the first locating piece acts on an outer surface of the chuck and applies pressure. The first locating piece is stressed by an elastic piece, so that the first locating piece can move elastically. The assembly cavity is also internally provided with a second locating piece, and the second locating piece acts on the side of the chuck and applies pressure.

10 Claims, 11 Drawing Sheets

ASSEMBLY STRUCTURE FOR MOBILE PHONE CLIP MODULE

TECHNICAL FIELD

The present disclosure belongs to the technical field of mobile phone clip devices, and specifically relates to an assembly structure for a mobile phone clip module.

BACKGROUND

The mobile phone is an essential intelligent tool used in daily life and work, and photographing and video recording are also major functions of the mobile phone. Accordingly, more and more devices such as mobile phone clips have appeared, and the mobile phone clip generally clips both sides of the mobile phone through a clamping mechanism on the mobile phone clip to fix the mobile phone.

At present, the mobile phone clip is generally arranged on a selfie stick, a tripod, a mobile phone stand and other devices, and is assembled through bolt structures. The mobile phone clip assembled by bolts is troublesome to assemble and disassemble, and can only be positioned when the bolts are tightened. At this time, the angle of the mobile phone clip cannot be adjusted, and the mobile phone clip is inflexible to use. Based on this, an assembly structure for a mobile phone clip module in the prior art is further improved and designed in the present disclosure.

SUMMARY

Aiming at the disadvantages in the prior art, the present disclosure provides an assembly structure for a mobile phone clip module. The disc-slot installation method is adopted, the structure is very convenient to assemble and disassemble. The angle of the mobile phone clip can be flexibly adjusted as needed, and the stability is high after assembly. The structure can cooperate with the magnetic attraction structure to realize magnetic attraction assembly.

The present disclosure is solved through the following technical scheme.

The present disclosure provides an assembly structure for a mobile phone clip module. The assembly structure for a mobile phone clip module includes a mobile phone clip body. The back of the mobile phone clip body is provided with a chuck for assembly. The assembly structure for a mobile phone clip module also includes an assembly seat. An assembly cavity for the chuck to enter is formed in the assembly seat. The assembly cavity is internally provided with a first locating piece, and the first locating piece acts on an outer surface of the chuck and applies pressure. The first locating piece is stressed by an elastic piece, so that the first locating piece can move elastically. The assembly cavity is also internally provided with a second locating piece, and the second locating piece acts on the side of the chuck and applies pressure. The second locating piece is stressed by an elastic piece, so that the second locating piece can move elastically.

According to the assembly structure for a mobile phone clip module in the present disclosure, the assembly method of clamping the chuck is adopted, and the installation and disassembly of the mobile phone clip body can be realized conveniently. Specifically, the mobile phone clip body is clamped in the assembly cavity in the assembly seat through the chuck on the back, and then the chuck is axially locked through the first locating piece. The chuck is radially locked through the second locating piece to realize assembly. At the same time, the first locating piece and the second locating piece are elastically movable to a certain extent, so the chuck can be taken out from the assembly cavity through application of external force, and the structure is convenient to detach.

In an optimized embodiment, the assembly seat is provided with an operating piece, and after the operating piece is operated, the operating piece can apply force on the first locating piece, and the pressure applied by the first locating piece on the outer surface of the chuck is reduced or disappeared. At this time, the chuck can be conveniently detached from the assembly cavity, or the posture of the mobile phone clip body can be conveniently adjusted by rotating the chuck.

In an optimized embodiment, the chuck is a disc-shaped chuck, and the periphery of the chuck is provided with a convex edge. A side wall of the assembly cavity is provided with a flanging and forms a clamping groove, and the convex edge of the chuck is limited in the clamping groove and can move. Through the structural cooperation between the convex edge and the clamping groove, the stability of assembly can be achieved, and the structure is not easy to come off. At the same time, a gap is formed between the convex edge and the clamping groove, so the resistance is small during moving. After moving in place, the convex edge is locked by the first locating piece and the second locating piece, especially the first locating piece abuts against the chuck, so that the convex edge abuts against the clamping groove to achieve locking.

In an optimized embodiment, the inner side of the assembly cavity is an arc structure matched with the contour of the chuck. Thus, when the chuck is placed on the innermost side of the assembly cavity, high assembly stability can be achieved, and the chuck is not easy to come off.

In an optimized embodiment, the inner side of the first locating piece is provided with a first locating piece base. The first locating piece base is placed in an inner cavity in the assembly seat. The back side of the first locating piece base is provided with a first elastic piece mounting position. The first elastic piece mounting position is provided with an elastic piece. The elastic piece can be a spring. Through elastic force of the elastic piece, the first locating piece can be pushed outwards to abut against the surface of the chuck.

In an optimized embodiment, the inner side of the operating piece is provided with a moving piece placed in the inner cavity. The moving piece is provided with a force application position for acting on the first locating piece base. The force application position can be an extrusion inclined plane. When the moving piece moves in the direction of the first locating piece base, the force application position can apply force to the first locating piece base. For example, the first locating piece base is extruded through the inclined plane, so that the first locating piece base moves inwards, and the pressure applied by the first locating piece on the outer surface of the chuck is reduced or disappeared. At that time, the mobile phone clip body can be conveniently rotated, or the mobile phone clip body can be conveniently disassembled.

In an optimized embodiment, the moving piece is provided with an elastic piece mounting position, and the elastic piece mounting position is provided with an elastic piece. The elastic piece can be a spring, and is used for keeping the moving piece at an initial position and only moves after being stressed.

In an optimized embodiment, the inner side of the second locating piece is provided with a second locating piece base placed in the inner cavity. The second locating piece base is provided with a second elastic piece mounting position, and the second elastic piece mounting position is provided with an elastic piece. The elastic piece can be spring, and is used for enabling the second locating piece to be of elastic movability, so that the chuck can be clamped, and elastic locking force is provided for the chuck.

In an optimized embodiment, the second locating piece is provided with a guide surface and a limiting surface. When the chuck is clamped, the edge of the chuck is pressed against the guide surface, and the second locating piece is forced to move outward, so that the chuck can be clamped. After the chuck is clamped, the second locating piece is reset under the action of the corresponding elastic piece. At this time, the limiting surface abuts against the edge of the chuck for limiting and locking to prevent the chuck from coming out.

In an optimized embodiment, the chuck is of magnetism. Therefore, the mobile phone clip body can be independently adsorbed on other iron objects for use after being detached.

Compared with the prior art, the present disclosure has the following beneficial effects that an assembly structure for a mobile phone clip module is provided. The disc-slot installation method is adopted, the structure is very convenient to assemble and disassemble. The angle of the mobile phone clip can be flexibly adjusted as needed, and the stability is high after assembly. The structure can cooperate with the magnetic attraction structure to realize magnetic attraction assembly and use, and the use flexibility is high.

DETAILED DESCRIPTION OF THE EMBODIMENTS

Figure 1:
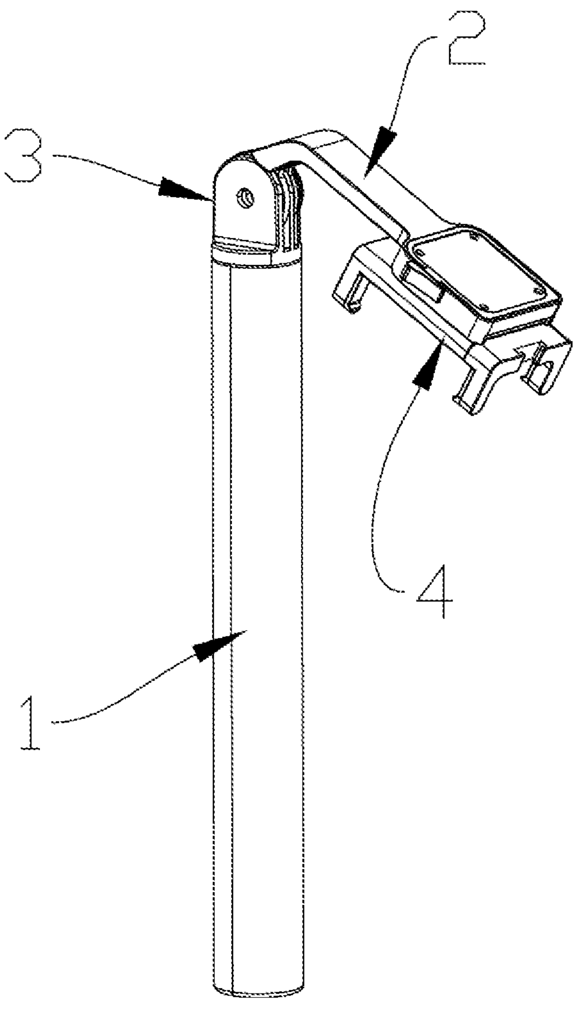
FIG. 1 is a space diagram of an assembly structure used on a selfie stick in the present disclosure.
Figure 2:
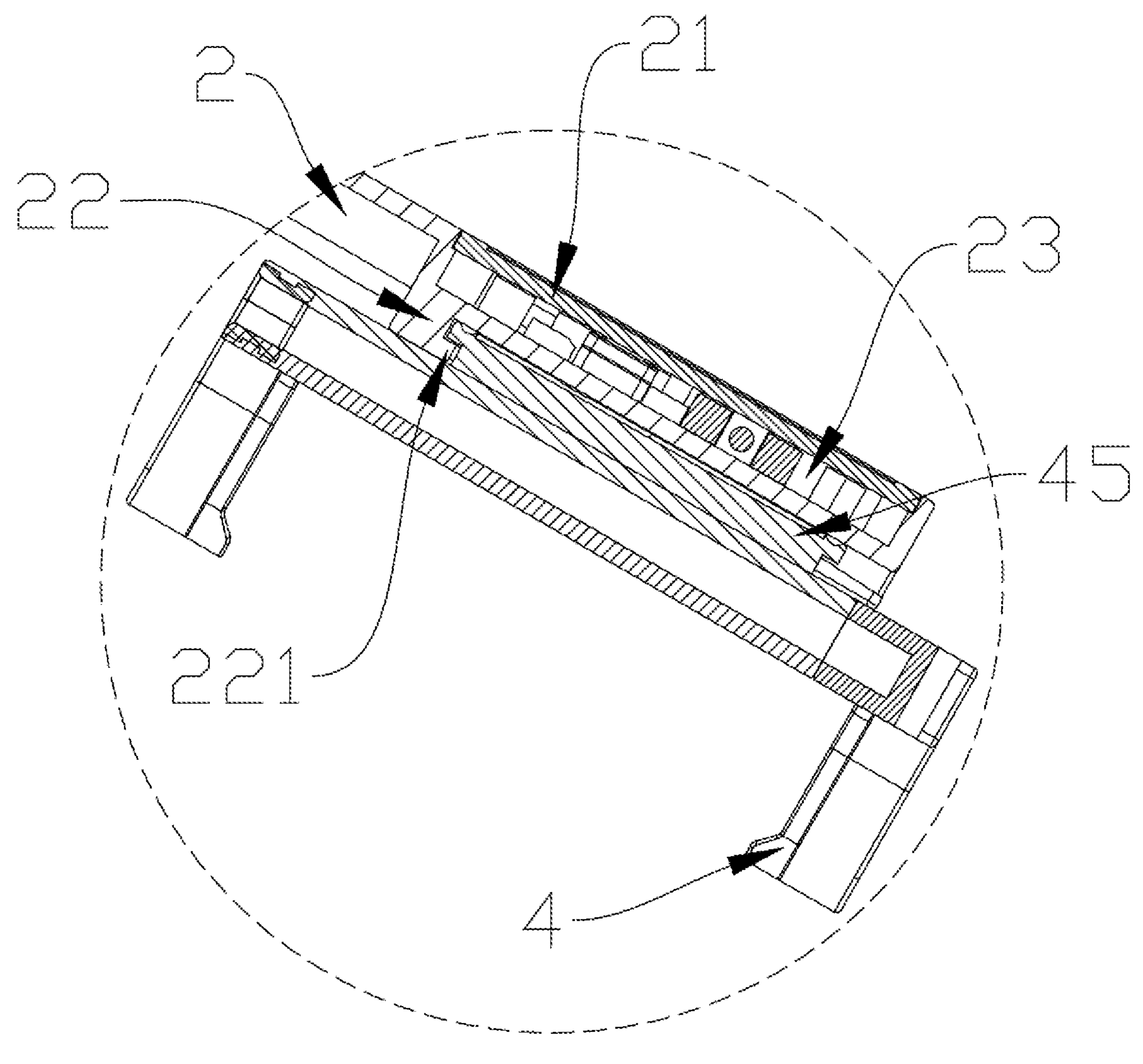
FIG. 2 is a section view at the position of an assembly structure in the present disclosure.
Figure 3:
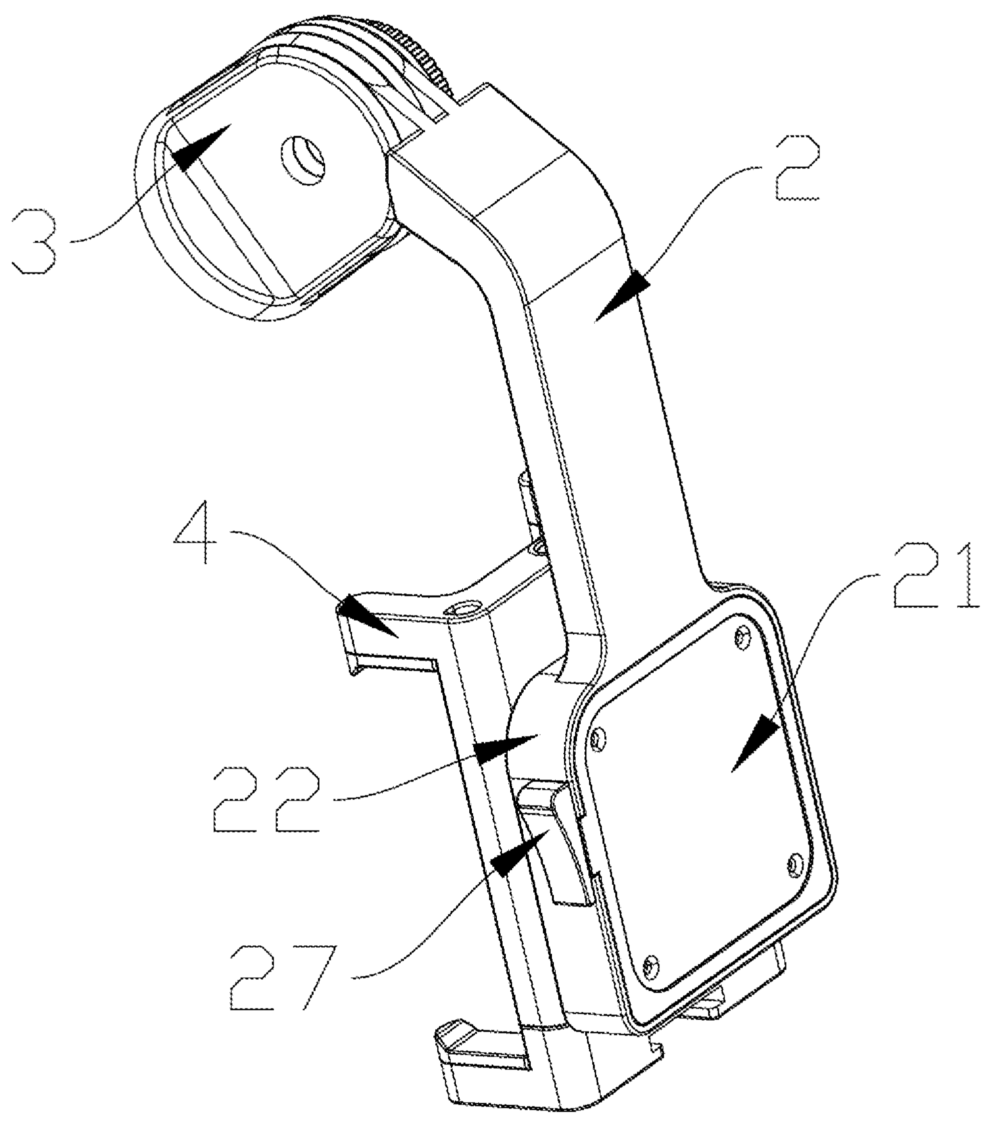
FIG. 3 is a first space diagram of an assembly structure on a selfie stick in the present disclosure.
Figure 4:
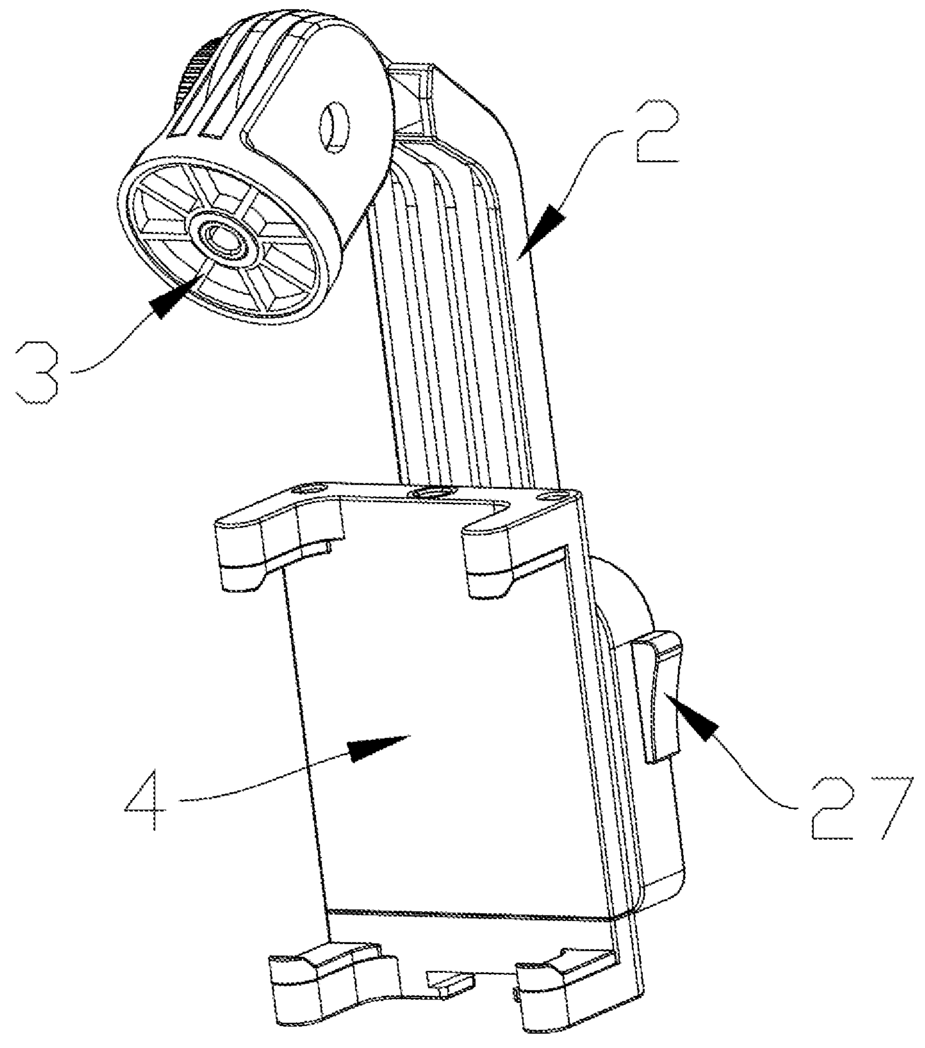
FIG. 4 is a second space diagram of an assembly structure on a selfie stick in the present disclosure.
Figure 5:
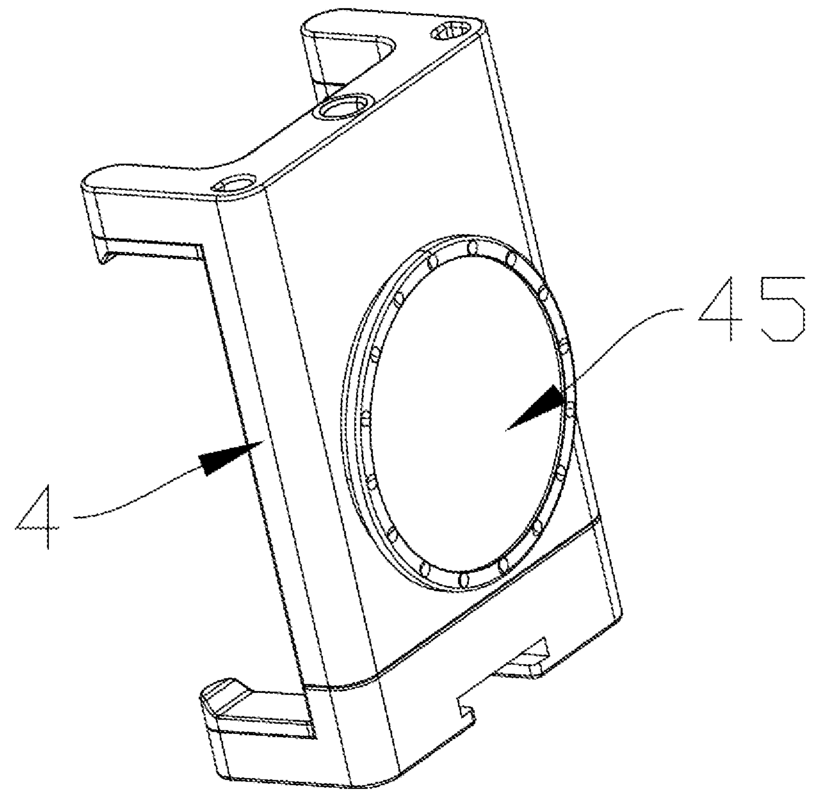
FIG. 5 is a space diagram of a mobile phone clip body in the present disclosure.
Figure 6:
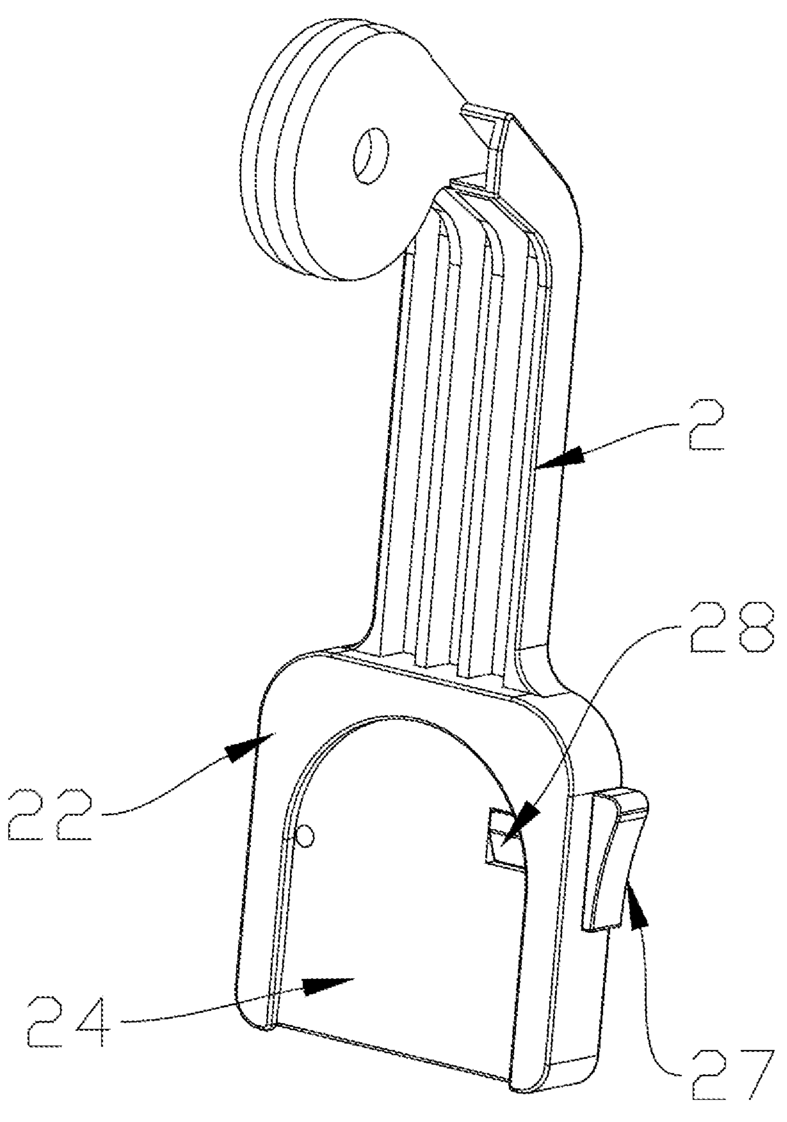
FIG. 6 is a space diagram of an assembly seat and a structure where the assembly seat is located in the present disclosure.
Figure 7:
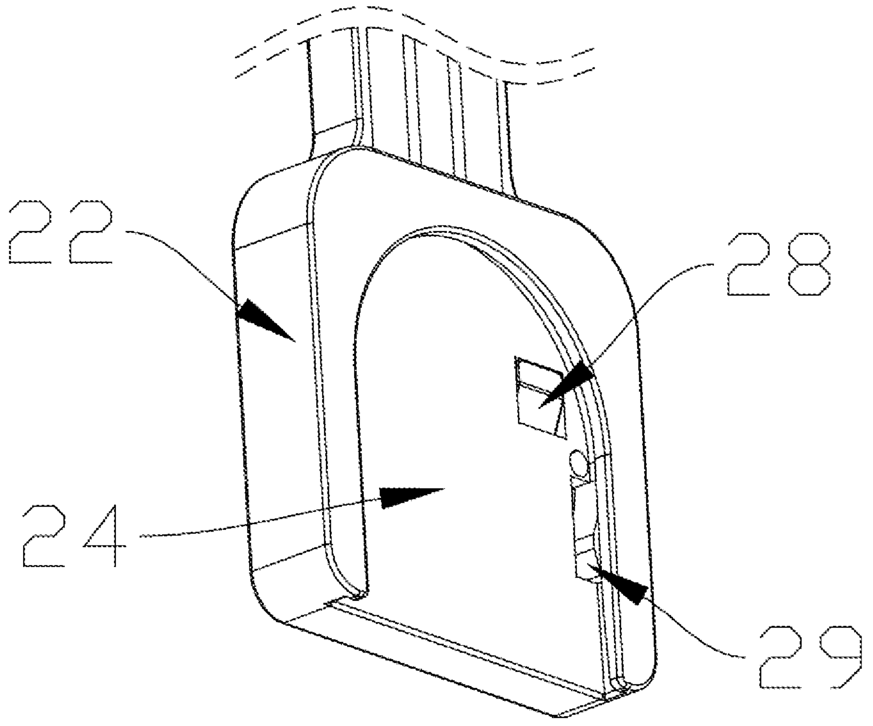
FIG. 7 is a space diagram of an assembly seat in the present disclosure.
Figure 8:
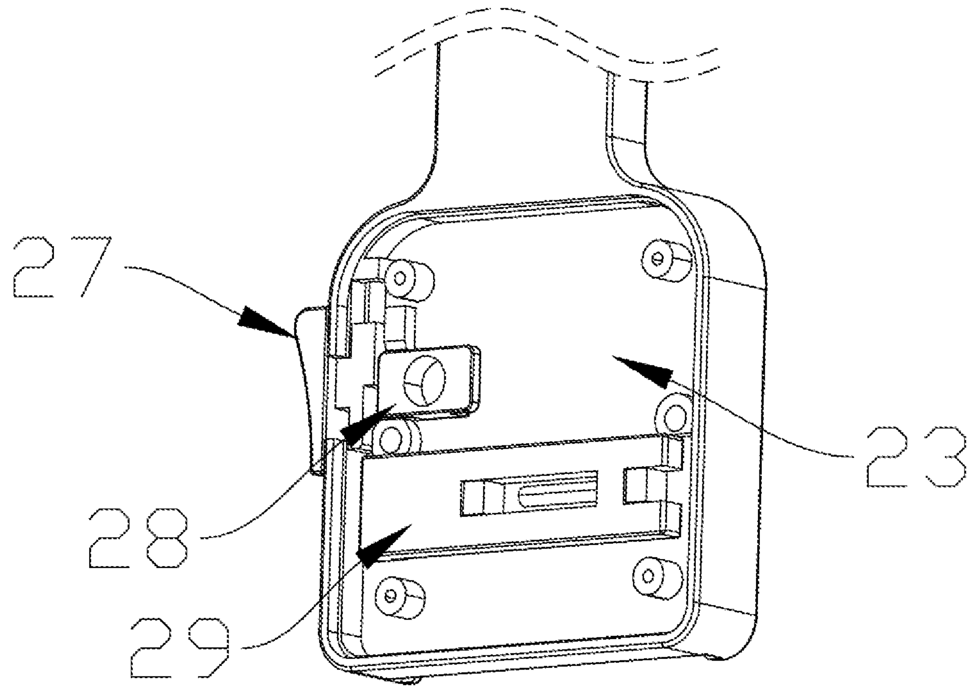
FIG. 8 is a structural schematic diagram of an omitted back plate of an assembly seat in the present disclosure.

The present disclosure is further described in detail in conjunction with the attached figures and embodiments.

In the following embodiments, the same or similar reference mark numbers indicate the same or similar elements or elements with the same or similar functions. The embodiments described below by reference to the attached figures are exemplary only for explaining the present disclosure and are not to be construed as limiting the present disclosure.

In the description of the present disclosure, it needs to be illustrated that the indicative direction or position relations of the terms such as "center", "longitudinal", "transverse", "length", "width", "thickness", "upper", "lower", "front", "rear", "left", "right", "vertical", "horizontal", "top", "bottom", "inside", "outside", "clockwise" and "counterclockwise" are direction or position relations illustrated based on the attached figures, just for facilitating the description of the present disclosure and simplifying the description, and the terms cannot be understood as the restriction of the present disclosure. In addition, the terms "first" and "second" are merely intended for a purpose of description, and shall not be understood as an indication or implication of relative importance or implicit indication of the number of indicated technical features. In the description of the present disclosure, it needs to be illustrated that, except as otherwise noted, the terms such as "install", "link" and "connect" should be generally understood. For those skilled in the art, the specific meanings of the terms in the present disclosure can be understood according to specific conditions.

Referring to FIG. 1 to FIG. 11, the present disclosure relates to an assembly structure for a mobile phone clip module. From FIG. 1, it can be seen that the assembly structure for a mobile phone clip module can be applied to the conventional selfie stick. The selfie stick includes a stick body 1. The upper part of the stick body 1 is provided with a rotating part 3. The rotating part 3 is provided with a rotatable rotating part 2. The end of the rotating part 2 is provided with an assembly seat 22. The assembly seat 22 is provided with a mobile phone clip body 4. The selfie stick is only a conventional use scenario of the assembly structure for a mobile phone clip module in the present disclosure. The assembly structure for a mobile phone clip module can also be arranged on the mobile phone stand, the mobile phone gimbal and other devices.

Specifically, the assembly structure for a mobile phone clip module provided in the present disclosure includes a mobile phone clip body 4. The back of the mobile phone clip body 4 is provided with a chuck 45 for assembly. The assembly structure for a mobile phone clip module also includes an assembly seat 22. An assembly cavity 24 for the chuck 45 to enter is formed in the assembly seat 22. The assembly cavity 24 is internally provided with a first locating piece 28, and the first locating piece 28 acts on an outer surface of the chuck 45 and applies pressure. The first locating piece 28 is stressed by an elastic piece, so that the first locating piece 28 can move elastically. The assembly cavity 24 is also internally provided with a second locating piece 29, and the second locating piece 29 acts on the side of the chuck 45 and applies pressure. The second locating piece 29 is stressed by an elastic piece, so that the second locating piece 29 can move elastically.

Moreover, in the structure of the present disclosure, the assembly seat 22 is provided with an operating piece 27, and after the operating piece 27 is operated, the operating piece 27 can apply force on the first locating piece 28, and the pressure applied by the first locating piece 28 on the outer surface of the chuck 45 is reduced or disappeared. At this time, the chuck 45 can be conveniently detached from the assembly cavity 24, or the posture of the mobile phone clip body 4 can be conveniently adjusted by rotating the chuck 45.

From FIG. 5 to FIG. 8, it can be seen that in the present disclosure, the chuck 45 is a disc-shaped chuck 45, and the periphery of the chuck 45 is provided with a convex edge. A side wall of the assembly cavity 24 is provided with a flanging 211 and forms a clamping groove, and the convex edge of the chuck 45 is limited in the clamping groove and can move. Through the structural cooperation between the convex edge and the clamping groove, the stability of assembly can be achieved, and the structure is not easy to come off. At the same time, a gap is formed between the convex edge and the clamping groove, so the resistance is small during moving. After moving in place, the convex edge is locked by the first locating piece 28 and the second locating piece 29, especially the first locating piece 28 abuts against the chuck 45, so that the convex edge abuts against the clamping groove to achieve locking. Moreover, the inner side of the assembly cavity 24 is an arc structure matched with the contour of the chuck 45. Thus, when the chuck 45 is placed on the innermost side of the assembly cavity 24, high assembly stability can be achieved, and the chuck 45 is not easy to come off.

Figure 9:
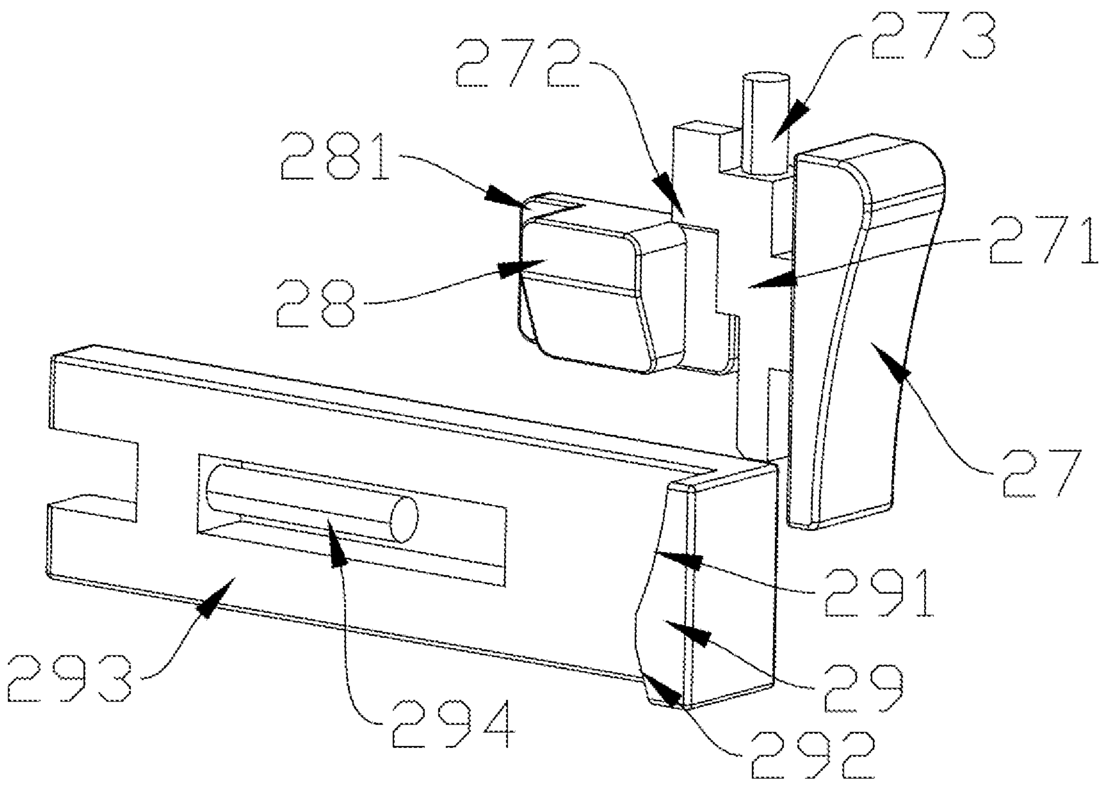
FIG. 9 is a first structural space diagram in an inner cavity of an assembly seat in the present disclosure.
Figure 10:
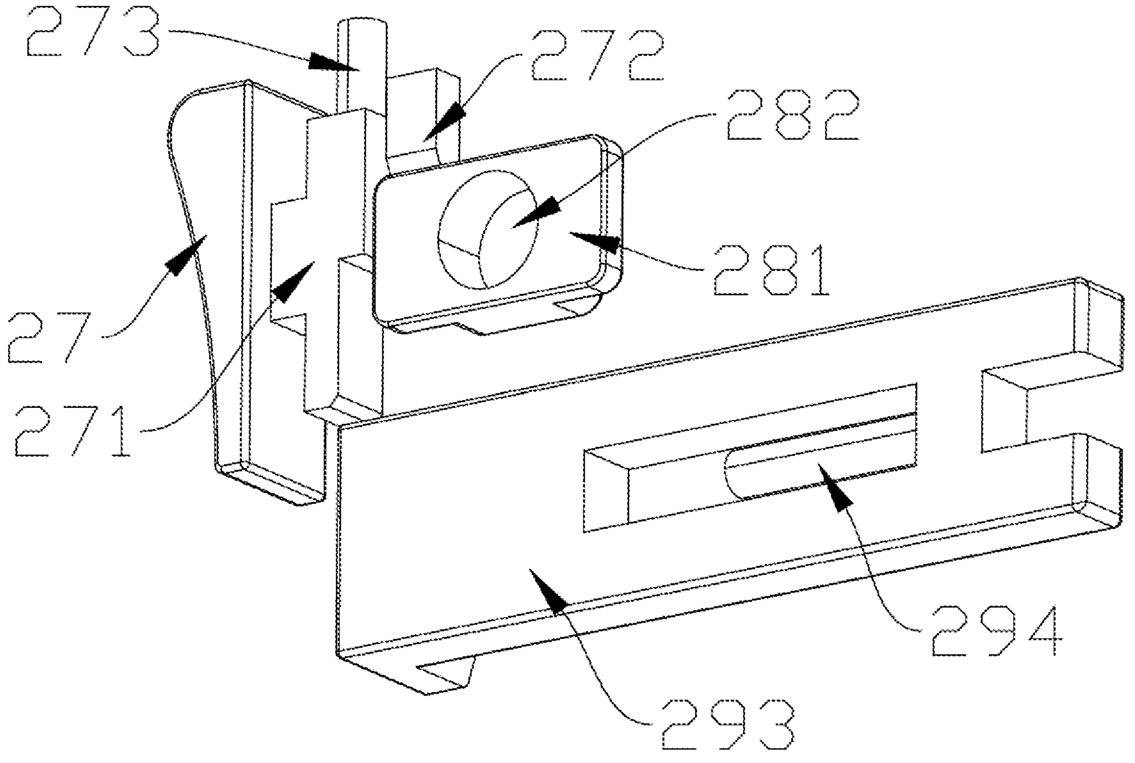
FIG. 10 is a second structural space diagram in an inner cavity of an assembly seat in the present disclosure.
Figure 11:
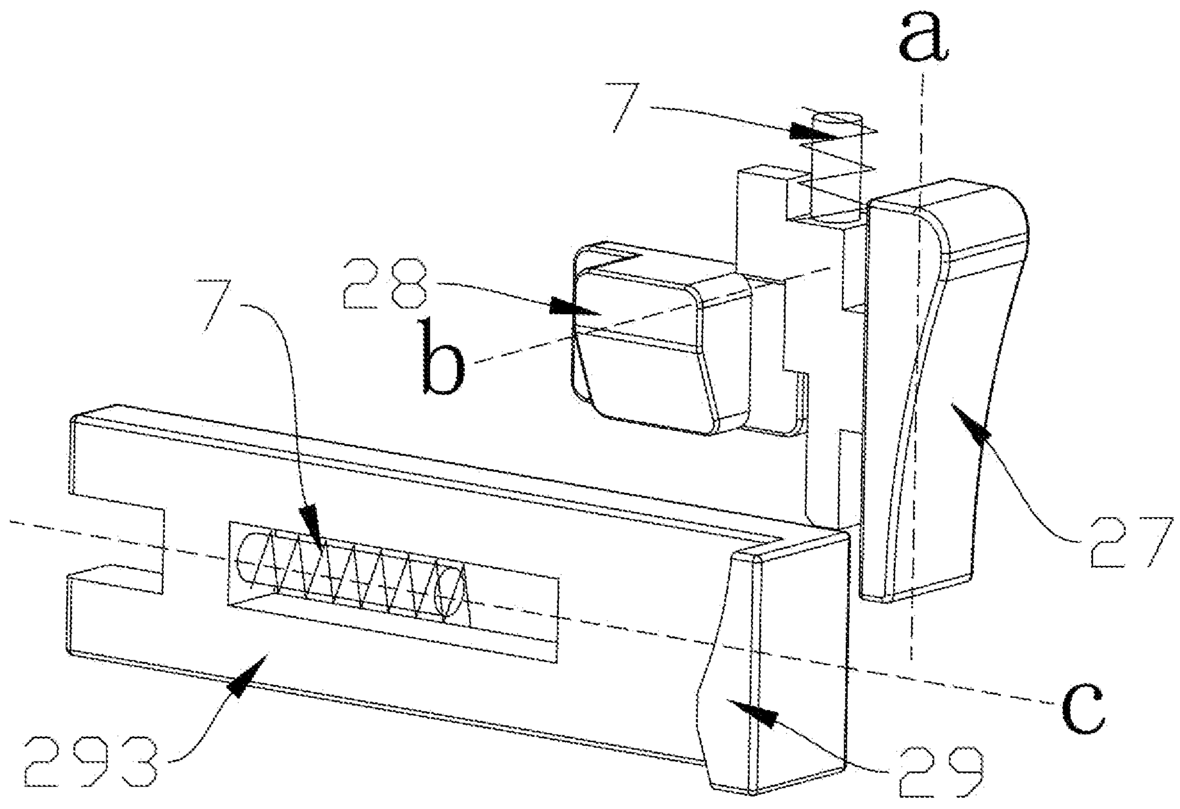
FIG. 11 is a schematic diagram of a moving direction of a structure in an inner cavity of an assembly seat in the present disclosure.

Further, from FIG. 9 to FIG. 11, it can be seen that in the present disclosure, the inner side of the first locating piece 28 is provided with a first locating piece base 281. The first locating piece base 281 is placed in an inner cavity 23 in the assembly seat 22. The inner cavity 23 is sealed by a back plate 21. The back side of the first locating piece base 281 is provided with a first elastic piece mounting position 282. The first elastic piece mounting position 282 is provided with an elastic piece. The elastic piece can be a spring. Through elastic force of the elastic piece, the first locating piece 28 can be pushed outwards to abut against the surface of the chuck 45.

From FIG. 9 to FIG. 11, it also can be seen that in the present disclosure, the inner side of the operating piece 27 is provided with a moving piece 271 placed in the inner cavity 23. The moving piece 271 is provided with a force application position 272 for acting on the first locating piece base 281. The force application position 272 can be an extrusion inclined plane. When the moving piece 271 moves in the direction of the first locating piece base 281, the force application position 272 can apply force to the first locating piece base 281. For example, the first locating piece base 281 is extruded through the inclined plane, so that the first locating piece base 281 moves inwards, and the pressure applied by the first locating piece 28 on the outer surface of the chuck 45 is reduced or disappeared. At that time, the mobile phone clip body 4 can be conveniently rotated, or the mobile phone clip body 4 can be conveniently disassembled. The moving piece 271 is provided with an elastic piece mounting position 273, and the elastic piece mounting position 273 is provided with an elastic piece. The elastic piece can be a spring, and is used for keeping the moving piece 271 at an initial position and only moves after being stressed.

From FIG. 9 to FIG. 11, it also can be seen that in the present disclosure, the inner side of the second locating piece 29 is provided with a second locating piece base 293 placed in the inner cavity 23. The second locating piece base 293 is provided with a second elastic piece mounting position 294, and the second elastic piece mounting position 294 is provided with an elastic piece. The elastic piece can be spring, and is used for enabling the second locating piece 29 to be of elastic movability, so that the chuck 45 can be clamped, and elastic locking force is provided for the chuck 45. Further, the second locating piece 29 is provided with a guide surface 292 and a limiting surface 291. When the chuck 45 is clamped, the edge of the chuck 45 is pressed against the guide surface 292, and the second locating piece 29 is forced to move outward, so that the chuck 45 can be clamped. After the chuck 45 is clamped, the second locating piece 29 is reset under the action of the corresponding elastic piece. At this time, the limiting surface 291 abuts against the edge of the chuck 45 for limiting and locking to prevent the chuck 45 from coming out.

In FIG. 11, it can be seen that three dotted lines are used to show the respective movable directions of the first locating piece 28, the second locating piece 29 and the operating piece 27. The first locating piece 28 can move back and forth by a short distance along the dotted line b for abutting against the surface of the chuck 45. The second locating piece 29 can move from left to right by a short distance along the dotted line c for acting on the edge of the chuck 45, and can be detached in cooperation with the clamping und disengagement of the chuck 45. The operating piece 27 can move up and down by a short distance along the dotted line a for interacting with the first locating piece base 281 to move the first locating piece 28 backward.

In FIG. 11, an embodiment of the spring 7 as an elastic piece is also shown. In the embodiment, the inner cavity 23 is internally provided with some corresponding protrusions for abutting against an outer end of the spring 7. For the spring in the first elastic piece mounting position 282, an outer end of the first elastic piece mounting position 282 abut against an inner surface of the back plate 21. These structures can limit the spring and provide elastic force.

In addition, in one embodiment of the present disclosure, the chuck 45 is of magnetism. For example, the chuck 45 can be made of a magnet, or a magnet block is arranged on the chuck 45, so that the mobile phone clip body 4 can be independently adsorbed on other iron objects for use after being detached, and the use scene of the mobile phone clip module is greatly expanded. From the above description, it can be seen that according to the assembly structure for a mobile phone clip module in the present disclosure, the assembly method of clamping the chuck is adopted, and the installation and disassembly of the mobile phone clip body 4 can be realized conveniently. Specifically, the mobile phone clip body 4 is clamped in the assembly cavity 24 in the assembly seat 22 through the chuck 45 on the back, and then the chuck 45 is axially locked through the first locating piece 28. The chuck is radially locked through the second locating piece 29 to realize assembly. At the same time, the first locating piece 28 and the second locating piece 29 are elastically movable to a certain extent, so the chuck 45 can be taken out from the assembly cavity 24 through application of external force, and the structure is convenient to detach.

As mentioned above, in the present disclosure, the disc-slot installation method is adopted, the structure is very convenient to assemble and disassemble. The angle of the mobile phone clip can be flexibly adjusted as needed, and the stability is high after assembly. The structure can cooperate with the magnetic attraction structure to realize magnetic attraction assembly and use, and the use flexibility is high.

The scope of protection in the present disclosure includes but is not limited to the above-mentioned embodiments. The scope of protection in the present disclosure is subject to the claims, and any substitution, deformation and improvement easily thought of by those skilled in the art fall within the scope of protection in the present disclosure.

What is claimed is:

1. An assembly structure for a mobile phone clip module, comprising a mobile phone clip body, wherein the back of the mobile phone clip body is provided with a chuck for assembly; the assembly structure for a mobile phone clip module also comprises an assembly seat, and an assembly cavity for the chuck to enter is formed in the assembly seat;

the assembly cavity is internally provided with a first locating piece, and the first locating piece acts on an outer surface of the chuck and applies pressure; the first locating piece is stressed by an elastic piece, so that the first locating piece can move elastically; the assembly cavity is also internally provided with a second locating piece), and the second locating piece acts on the side of the chuck and applies pressure; and the second locating piece is stressed by an elastic piece, so that the second locating piece can move elastically.

2. The assembly structure for a mobile phone clip module according to claim 1, wherein the assembly seat is provided with an operating piece, and after the operating piece is operated, the operating piece can apply force on the first locating piece, and the pressure applied by the first locating piece on the outer surface of the chuck is reduced or disappeared.

3. The assembly structure for a mobile phone clip module according to claim 2, wherein the chuck is a disc-shaped chuck, and the periphery of the chuck is provided with a convex edge; a side wall of the assembly cavity is provided with a flanging and forms a clamping groove, and the convex edge of the chuck is limited in the clamping groove and can move.

4. The assembly structure for a mobile phone clip module according to claim 3, wherein the inner side of the assembly cavity is an arc structure matched with the contour of the chuck.

5. The assembly structure for a mobile phone clip module according to claim 2, wherein the inner side of the first locating piece is provided with a first locating piece base, the first locating piece base is placed in an inner cavity in the assembly seat, and the back side of the first locating piece base is provided with a first elastic piece mounting position, and the first elastic piece mounting position) is provided with an elastic piece.

6. The assembly structure for a mobile phone clip module according to claim 5, wherein the inner side of the operating piece is provided with a moving piece placed in the inner cavity, and the moving piece is provided with a force application position for acting on the first locating piece base, and when the moving piece moves in the direction of the first locating piece base, the force application position can apply force to the first locating piece base, and the pressure applied by the first locating piece on the outer surface of the chuck is reduced or disappeared.

7. The assembly structure for a mobile phone clip module according to claim 6, wherein the moving piece is provided with an elastic piece mounting position, and the elastic piece mounting position is provided with an elastic piece.

8. The assembly structure for a mobile phone clip module according to claim 2, wherein the inner side of the second locating piece is provided with a second locating piece base placed in the inner cavity, the second locating piece base is provided with a second elastic piece mounting position, and the second elastic piece mounting position is provided with an elastic piece.

9. The assembly structure for a mobile phone clip module according to claim 8, wherein the second locating piece is provided with a guide surface and a limiting surface.

10. The assembly structure for a mobile phone clip module according to claim 1, wherein the chuck is magnetic.

* * * * *